Oct. 27, 1970   W. B. CHILCOTE   3,536,548
THERMOSETTING RESIN INSULATED MULTISTRAND
ELECTRICAL CABLE AND PROCESS
Filed Aug. 26, 1968   2 Sheets-Sheet 1
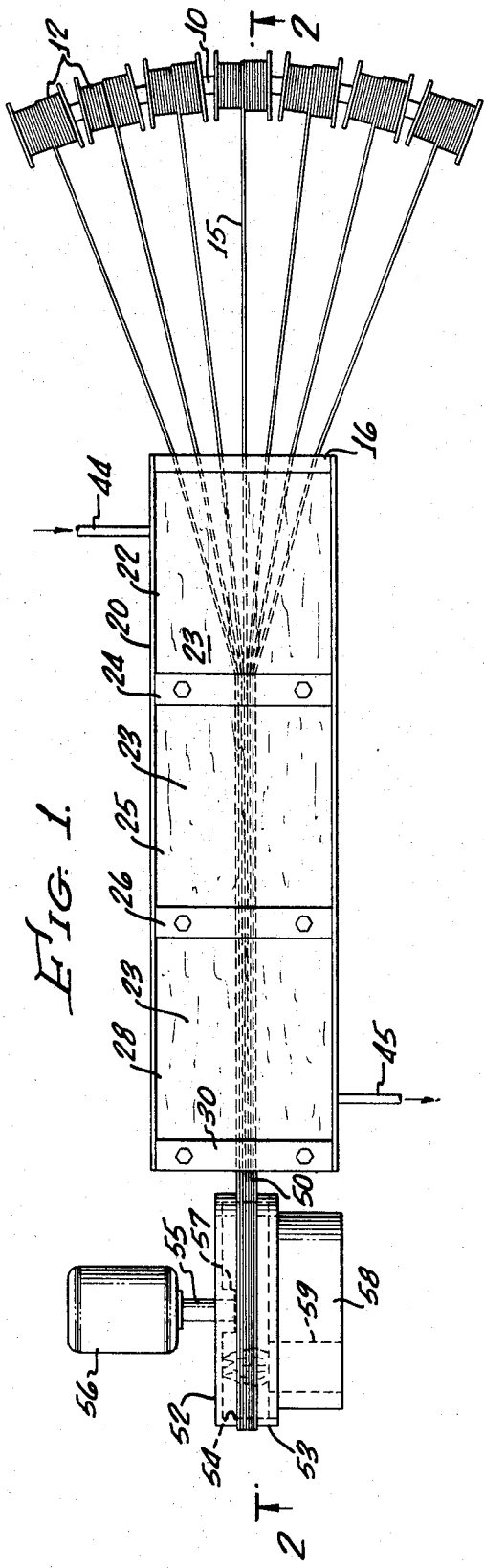
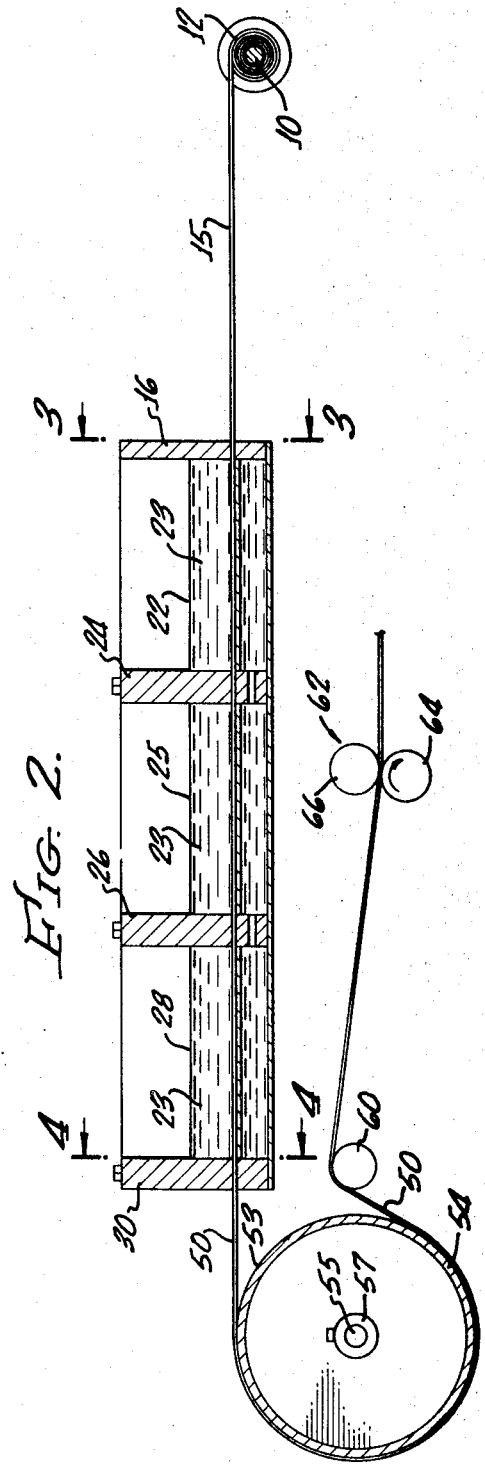
INVENTOR.
WILBUR B. CHILCOTE
BY
FOWLER, KNOBBE
& MARTENS
ATTORNEYS.

Oct. 27, 1970  W. B. CHILCOTE  3,536,548
THERMOSETTING RESIN INSULATED MULTISTRAND
ELECTRICAL CABLE AND PROCESS
Filed Aug. 26, 1968  2 Sheets-Sheet 2

INVENTOR.
WILBUR B. CHILCOTE
BY FOWLER, KNOBBE
& MARTENS
ATTORNEYS.

United States Patent Office 3,536,548
Patented Oct. 27, 1970

3,536,548
THERMOSETTING RESIN INSULATED MULTI-STRAND ELECTRICAL CABLE AND PROCESS
Wilbur B. Chilcote, 2032 Lower Lake Drive,
Santa Ana, Calif. 92705
Filed Aug. 26, 1968, Ser. No. 755,296
Int. Cl. H01b 13/16
U.S. Cl. 156—51                                  11 Claims

ABSTRACT OF THE DISCLOSURE

A process for producing flat, multistrand, insulated electrical cables of high integrity. A plurality of preinsulated conductors are aligned transversely in a coplanar arrangement with a small transverse spacing between each of the conductors. This coplanar arrangement of conductors is shaped into a cable and coated by passing the arrangement through a thermosetting resin bath which includes a curing accelerator therein. The thermosetting resin is deaerated by pressing and squeezing the conductors together as they pass out of the bath. The electrical conductors with the deaerated resin coating thereon are then again contacted with the thermosetting resin to produce the final cable dimensions. The resin is then molded and cured by passing the conductor arrangement over a heated cylindrical surface. The preferred preinsulation for the electrical conductors and the preferred thermosetting resin is silicone rubber.

BACKGROUND OF INVENTION

There are several commonly used methods for producing flat electrical cable containing a plurality of conducting strands. One of these methods is to coat the strands with an insulating material such as rubber or resin by passing all of the strands through a bath of the rubber or resin and then through an oven which cures the coating to form an insulated cable. This method is cumbersome since the individual conductors which are usually formed from a plurality of the fine copper wires are hard to handle and to get the coating material to adhere thereto. Cables produced by this method may have electrical leakage from one strand to another resulting from defects in the coating applied to the cable. Also, with this type of cable, it is extremely difficult to separate one strand from another for connecting to different terminals. This must usually be done under a microscope with a fine cutting edge such as a razor blade. Consequently, this requires trained personnel and is time consuming.

Another process which is commonly used to produce flat electrical cable comprises coating the individual strands with a thermoplastic resin such as the polyvinyls, polystyrenes, polyethylenes or polypropylenes and then passing the individual strands between heated blades which melt the side surfaces of the coating strands and permit them to be fused when the strands are transversely squeezed together. This process is not applicable for use with the thermosetting resins. The flexibility and thermal resistivity of the thermoplastic resins are generally not as good as the thermosetting resins. Thus cable formed in this manner is of limited use.

Flat multiconductor electrical cable is also formed by solvent welding. In this process a portion of the insulation on individual conductors is dissolved in an appropriate solvent and the conductors are then forced together to form a unitary cable. Solvent control and insulation integrity are problems which must be dealt with in such processes. These processes are messy and the properties of cable produced are not always uniform due to the variability of the solvent attack on the insulation.

Previous attempts to manufacture flat cables from thermosetting materials such as phenolic resins, alkyd resins, amino resins, polyesters, epoxies, polyurethanes and the silicones have been ineffective since these resins cannot be remelted and fused for joining the preinsulated conductors. Additionally air entrapment between the preinsulated individual conductor strands and in the viscous thermosetting resin produces defects which reduce the quality of the cable producible with thermosetting resins. For the fast curing thermosetting resins, the pot life after the addition of the curing catalyst is short so that the resin may cure before it is applied to the conductors thus solidifying in the treating bath and requiring a constant monitoring of the resin condition.

Ideally, the flat cable formed from a plurality of electrical conductors should have a dielectric coating which is flexible so that the cable can be used without restriction on motion. Additionally, the conductors comprising the cable should be easily separable transversely for connecting to different terminals but at the same time should be individually insulated. The insulation of the individual conductors and of the cable should be of high integrity. Additionally, the individual conductors should be each preinsulated for ease in handling and so that the wires can be individually tested for conductivity and continuity.

SUMMARY OF INVENTION

This invention is directed to a process for producing flat, multistrand, insulated electrical cables of high integrity using a thermosetting insulating resin. The process joins electrical conductors which are individually preinsulated with a material such as silicone rubber. The preinsulated conductors are transversely aligned in a substantially coplanar arrangement with a small transverse spacing between each of the insulated conductors. This coplanar arrangement of electrical conductors is then passed through a thermosetting resin bath which includes a curing accelerator therein. As the electrical conductors pass through the bath all surfaces of each conductor are coated with resin. Air is removed from the coatings by applying transverse and vertical pressure to the arrangement forcing the electrical conductors closer to each other in a cable configuration and forcing entrapped air from the thermosetting resin and from between the conductors. The final thickness of the thermosetting resin on the cable is controlled by passing the conductors through a shaping die which communicates with another bath of thermosetting resin. This shaping die is provided with horizontally and vertically spaced die blocks which shape and dimension the coating on the conductors into a final flat cable form. As the conductors pass out of the shaping die, they are immediately cured by a cylindrical continuous molding and curing device which may comprise a disc having a smooth cylindrical surface mounted for rotation about a horizontal axis. The cable travels over the cylindrical surface as it rotates. This surface permits the thermosetting resin to settle and be molded into a flat smooth finish about the conductors. The disc surface is heated to a curing temperature of from 250° to 600° F. so that the resin is rapidly cured when it contacts the surface.

It has been found that if the continuous molding and curing device is an aluminum disc having a circumferential surface which forms a mold for the cable, and the temperature is adjusted so that it is maintained within the 250° to 600° F. range, it is possible to obtain a fully cured cable in as little as four seconds from the time the cable leaves the shaping die. The time for cure is dependent on the temperature of the disc and the disc diameter which controls the residence time of the cable on the disc. For example with a larger diameter disc it is possible to move the cable faster since the cable contacts a greater length of heated surface. The size of the cable is also a factor in determining the curing time. Generally, less than 45 seconds is required for complete curing. In this fashion, the cable can be passed through the thermosetting resin bath at a fairly rapid rate and immediately cured for storage on a coil or other such member.

When silicone rubber is used as the coating material it has been found that it is possible to obtain a thorough cure at a temperature about 350° F. in less than 10 seconds. To obtain such a cure it has been found necessary to pass the cable onto the cylindrical surface of the rotating disc and rotate the cable partially around the circumference of the disc to maintain contact with the disc while curing is taking place. In this case the disc is provided with a highly polished circumferential surface which is wide enough to accommodate the width of the cable to be cured. For example if a cable width of ½ inch is desired the width of the disc at the circumference thereof should preferably be at least from ¾ to 1 inch. This provides a wide enough surface to assure that the entire transverse section of the cable is evenly cured. Any narrower circumferential surface on the curing and molding disc would cause the cable to be cured unevenly across the transverse cross section.

The preferred thermosetting resin for use as a coating material in the process of this invention is silicone rubber such as General Electric's 615A which has a specific gravity of 1.02, a tensile strength at full cure of from 800 to 1000 p.s.i., with 100 to 150% elongation. The dielectric constant of this material is about 3 and its resistivity is $1 \times 10^{14}$. In the liquid state, the viscosity of the silicone rubber is about 3500 centipoise. The cured resin has a Shore "A" hardness of 50. Also representative of this group of materials is General Electric's RTV30 which has a specific gravity of 1.45 and in the cured condition has a shore hardness of 60 on the "A" scale and a tensile strength of 850 p.s.i. The elongation is about 130%. The electrical characteristics of this material are substantially the same as the 615A resin.

The silicon rubbers contemplated for use in this invention are the polysiloxanes which are prepared by hydrolysis of organohalogenosilanes, for example, the methy and phenyl chlorosilanes either alone or combined. The hydrolysis of these materials results in a rubber-like product depending upon the organohalogenosilane or mixture thereof used. The hydrocarbon radicals which attach to the silicone atoms in either the organohalogenosilane or the organopolysiloxane prepared therefrom may be a hydrocarbon radical selected from a group consisting of alkyl, aryl, alkaryl, and aralkyl radicals. The preferred organopolysiloxanes include the methyl, methyl phenyl, methyl vinyl and methyl phenyl vinyl hydrocarbon radicals because of their exceptionally good high and low temperature properties. Various organopolysiloxane compositions containing different silicon-bonded hydrocarbon radicals may be prepared and used for the present purposes, however, to obtain desired properties of the ultimate coating composition. The hydrocarbon to silicone ratios may range from 1 to less than 2. These materials and the processes for producing them are described in more detail in Rochow U.S. Pats. Nos. 2,258,218-222 issued Oct. 7, 1941 and in Welsh U.S. Pat. No. 2,449,572 issued Sept. 21, 1948.

These materials are chemically cured with metal soap catalysts or curing accelerators such as the metal laurates, stearates or other metal soaps of heavy alcohols and acids. For example, zinc laurate and zinc octoate or dibutyl tin laurate and tin octoate are representative of the type catalyst which may be used with the silicone coating resins. Generally, from about 0.5 to 4 percent by weight (based on the weight of the resin) of the curing accelerator is used. This curing accelerator is added to the resin bath prior to contact with the conductors.

Other thermosetting resins which can be used for producing the cables of this invention include any materials which have sufficient flexibility, are capable of adhering to the silicone rubber insulation of the individual electrical conductors, in the liquid state have a viscosity of between 400 and 7000 centipoise and are able to be catalytically cured at elevated temperatures in a relatively short time. These thermosetting resins include the polyesters, the alkyd resins, the polyurethanes, the phenolic resins and the epoxies.

It has been found that any resins which contain styrene or amine functional groups or which are catalyzed by styrene or amine containing catalyst are not usable since the styrene and amine groups attack the silicone rubber insulation of the electrical conductors.

It also has been found that the pressing and squeezing action can be applied to the cable arrangement of electrical conductors as it passes through the thermosetting resin bath best by means of a die which is designed to squeeze the electrical conductors transversely toward one another and vertically press the conductors to force out any air which may be entrapped between the conductors or on the surfaces of the conductors beneath the thermosetting resin. In this fashion, the resin is extruded about the surfaces of each of the individually insulated electrical conductors in a firmly adhering coating which is packed around each of the individually insulated conductors and between the conductors.

A second squeezing and pressing step is preferably included in the process after the conductors are shaped in the first such step. This may be accomplished by the inclusion of a second squeezing and pressing die and resin bath. This second die deaerates the cable arrangement to a greater degree than the first die which primarily deaerates the resin on the individual conductors.

In some instances it has been found necessary to use more than one deaerating die to remove all the entrapped air bubbles from the cable and from between the individual conductors.

By using a thermosetting resin which has a viscosity of from 400 to 7000 centipoise, it is possible to use apparatus with the process of this invention which is not tightly constructed so that fairly large tolerances can be maintained within the apparatus for adjusting the size of the coating which is extruded onto the arrangement of electrical conductors. If the viscosity of the resin is less than 400, the resin does not adequately adhere to the conductor insulation as the conductors pass through the bath and the apparatus must be more fluid tight to prevent leakage. If the viscosity of the resin is greater than 7000, it is too pasty to draw the conductors therethrough. The preferred viscosity is about 3500 centipoise.

The cable produced by the process of this invention comprises a flat, neat-appearing thermosetting resin cable with a plurality of individually insulated electrical conductors embedded in the thermosetting resin in a coplanar arrangement, evenly spaced one from the other. The conductor cable is flexible and resistant to high temperatures. For example, if silicone rubber is used as the thermosetting resin coating, the dielectric constant of the material is on the order of about 3 and the resistivity is about $1 \times 10^{14}$.

The longitudinal tensile strength of the cable is inherently greater than the transverse tensile strength thereof since the individual electrical conductors contribute to the longitudinal tensile strength and the applied coating provides all of the transverse tensile strength. Additionally, the bonding strength between the coating and the original insulation on the individual electrical conductors is less than the bonding strength between the molecules of the insulation on the individual conductors. Thus when it is desired to separate the conductors for connecting the cable to several terminals the individual conductors can easily be separated for any desired length along the cable. The remainder of the cable does not separate unless a relatively high transverse separating force is applied.

The apparatus for use in conducting the process of this invention has been adapted to produce the highest strength and quality electrical cables obtainable using thermosetting resins. This apparatus basically includes a bath for the resin which is bounded by a vertical pressing and transverse squeezing die for deaerating the resinous coating and which is in communication through this die with a second bath of the thermosetting resin which in turn communicates with the final forming and shaping die for determining the thickness of the applied coating. These resin baths are located adjacent a continuous molding and curing device which basically comprises a disc having a smooth curved, cylindrical surface, as discussed, for curing the coating as the cable moves over the disc. The disc is preferably heated to a temperature of from 250° to 600° F. by means of a simple Bunsen burner or other heating elements. For example, heating coils may be embedded in the disc to accurately regulate the temperature of the cylindrical surface of the disc.

One feature of the process and device of this invention is that electrically conductive multistrand cables can be produced which have insulating coatings which are flexible, neat-appearing and both thermally and electrically resistive.

Another feature of the process of this invention is that the insulating coatings which are applied to the multistrand cable are substantially air free so that no defects in appearance or strength are present.

Yet another feature of the process of this invention is that the cable can be manufactured at a rapid rate of speed and cured in less than 10 seconds so that the process is entirely continuous.

Another feature of the process of this invention is that the entire process can be performed in a relatively small space without the necessity of a large amount of equipment to conduct the coating and molding process.

Another feature of the process of this invention is that the preinsulated electrical conductors are easy to handle and can be tested for integrity of the insulation, continuity of the wires, mechanical strength of the conductors and other physical properties prior to incorporation into the cable.

Yet another feature of the process of this invention is that the preinsulated conductors are easy to manage and arrange in the configuration of a cable without danger of damaging the extruded and cured preinsulation.

Still another feature of the electrically resistive multistrand conductor cable of this invention is that the individual strands can be easily separated for attachment to electrical terminals without the use of sharp cutting instruments or microscopes.

These and other features of this invention will become more readily apparent from a consideration of the foregoing in view of the following detailed description of the preferred embodiments when taken in conjunction with the attached drawings and the appended claims.

BRIEF DESCRIPTION OF THE DRAWINGS

FIG. 1 is a plan view of the apparatus system showing a cable being produced by the process of this invention;

FIG. 2 is a longitudinal sectional view of the apparatus system for the process of this invention taken substantially along line 2—2 of FIG. 1 showing how the process of this invention is conducted;

DESCRIPTION OF PREFERRED EMBODIMENTS

Figure 3:
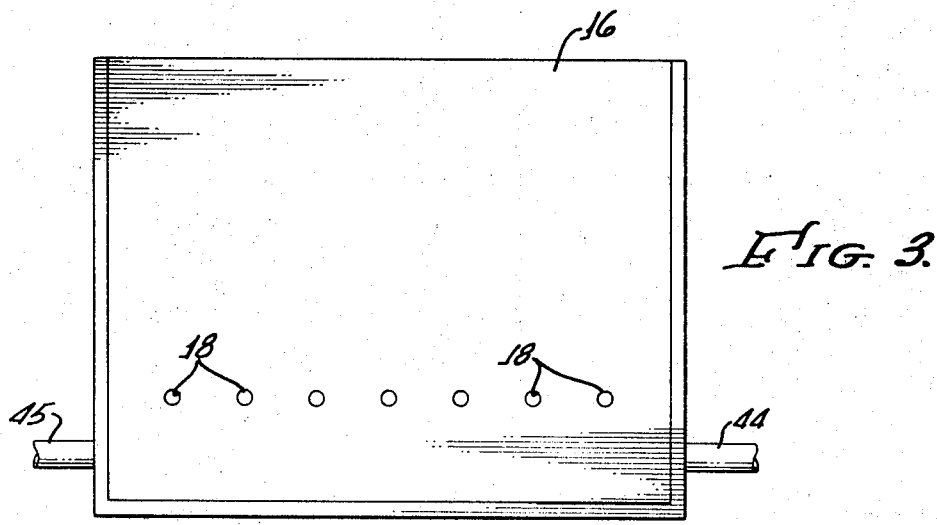
FIG. 3 is an end view of the spacing and aligning die used for the process taken substantially along line 3—3 of FIG. 2.

Referring now to FIG. 1 of the drawings it will be seen that the process of this invention can be performed without the use of large amounts of space consuming apparatus. A source of individually insulated electrical conductors is required such as the curved spool holding bar 10 which contains a plurality of spools 12 (7 shown) rotatably mounted on the bar 10. An electrical conductor 14 which has an insulating, cured, silicone rubber coating 15 (see FIGS. 4 and 6) thereon is contained on each of the spools 12. Any arrangement may be used for supplying a plurality of the insulated conductors in place of the bar 10 and the spools 12.

The insulation 15 on the conductors 14 is preferably an extruded coating which may be applied in conventional manner. The integrity of the insulation and conductivity and continuity of the wires are predetermined.

The insulated conductors 14 first pass through a spacing and aligning die 16 which, as shown in FIG. 3, is provided with a series of die orifices 18 which transversely space the electrical conductors 14 from each other in a coplanar arrangement. The spacing die 16 is connected to a trough-like vessel 20 which contains a first bath 22 of the thermosetting resin 23 (see FIG. 2). As the conductors 14 pass through the bath 22 they are spaced from each other so that all surfaces of the conductors are coated with the resin 23.

Three additional die members may be provided in the vessel 20. Two of these dies 24 and 26 perform a squeezing and pressing operation on the electrical conductors as they pass therethrough. As the conductors 14 pass through the first squeezing and pressing die 24 they are closely packed. At the same time the air bubbles entrapped between the conductors 14 or in the viscous coating resin 23 are extruded back into the bath 22.

The cable arrangement of the electrical conductors 14 then passes through the second thermosetting resin bath 25. As the conductors 14 pass through the second bath 25 they are held tightly together in a cable arrangement. The second squeezing and pressing die 26 may be provided for assuring complete removal of air from resin coating the cable-like arrangement of the electrical conductors 14 as it passes through the thermosetting resin bath 25. The second die 26 deaerates the cable arrangement whereas the first die 24 primarily deaerates the individual insulated conductors.

As the conductors leave the squeezing and pressing die 26 they enter into a third bath 28 of the thermosetting resin 23 which is maintained at substantially the same temperature as baths 22 and 25. The cable-like arrangement of the conductors travels through the bath 28 and into a third die 30 which is a sizing die for shaping the final coating of resin applied to the conductors. The die 30 does not squeeze and press the conductors together for removing air from the resin coating as do dies 24 and 26 but rather the die 30 removes excess coating from the sides and upper and lower surfaces of the cable arrangement of the conductors as it passes out of the coating vessel 20.

Figure 4:
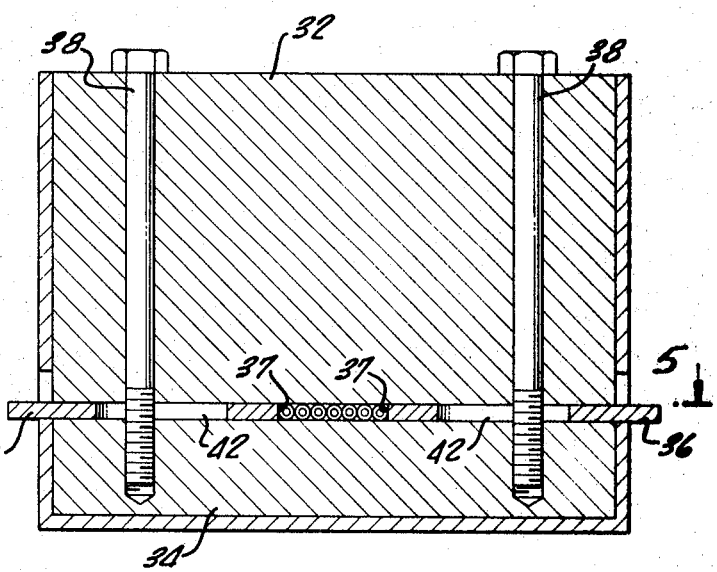
FIG. 4 is a transverse sectional view through the apparatus and the cable being formed taken substantially along line 4—4 of FIG. 2.
Figure 5:
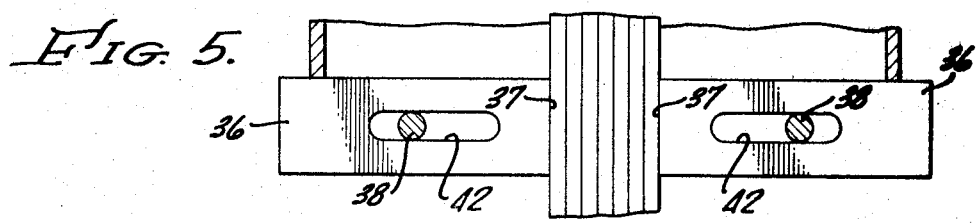
FIG. 5 is a horizontal sectional view taken substantially along line 5—5 of FIG. 4.

Each of the dies 24, 26 and 30 has a substantially rectangular orifice through which the electrical conductors must pass. As best shown in FIG. 4, this passage is defined by an upper die block 32, a lower die block 34 and a pair of side die plates 36 having vertical inner edges 37. The upper die block 32 is held in place by means of a pair of bolts 38 which fit in threaded apertures 40 in a lower die block 34. The lower die block 34 may be integrally formed with the base of the vessel 20. The die plates 36 as best shown in FIG. 5, are slotted at 42 to pass the bolts 38 therethrough. Thus the die plates 36 are transversely adjustable to control the width of the cable which is being formed. The inner edges 37 of the die plates 36 define the transverse width of the cable. This adjustability of the side plates 36 enables the number of strands of electrical conductors to be varied for each cable being formed.

The base of the trough 20 is preferably water cooled by means of inlet tubing 44 and outlet tubing 45 which are connected to a water circulating and cooling system (not shown). The base of the trough may be substantially hollow, as shown, to receive the circulating water and maintain the thermosetting resin at a temperature sufficiently low so that it will not cure before being applied to the cable. For example, when silicone rubber is used as the thermosetting resin coating material, the temperature of the bath should be maintained at between 50 and 75° F. to increase the pot life of the resin. The curing accelerator is added to the resin immediately prior to beginning the process.

As the conductors leave the final sizing die 30 they are in the shape of a flat cable 50 as shown in FIGS. 1 and 2. The cable 50 is then passed over a continuous molding and curing device 52 which is heated to a temperature of from 250° to 600° F. The cable 50 contacts the smooth circumferential surface 53 of the continuous molding and curing device as best shown in FIG. 2 while the device 52 revolves about its horizontal axis.

The continuous molding and curing device 52 preferably is made from a disc of a heat conductive material which has a relatively smooth cylindrical molding surface 53. For example the disc may be aluminum or steel. The surface 53 may be formed by a flange 54 which extends axially from the side of the disc shaped device 52 so that the thin flange 54 surrounds the heating element. Alternatively the disc 52 may be solid and of equal thickness throughout.

The disc is connected to the drive shaft 55 of an electrical motor 56 which rotates the disc at the desired speed. An axially-extending sleeve 57 is mounted on the disc for fitting over the shaft 55 for rotation therewith. The sleeve 57 may be connected to the shaft by any suitable manner such as connecting bolts or cotter pins.

A heating shield 58 which may typically include a Bunsen-type burner 59 is connected to the disc 52 to maintain the surface temperature thereof within the desired range. The thin flange 54 traps heat within the disc 52 to reduce heat loss. The shielded burner 58 also reduces heat loss. The thin flange 54 is preferred since it is more quickly responsive to changes in the burner temperature. Alternatively, electrical heating elements may be embedded in the disc.

As the cable 50 leaves the disc 52 in a cured condition, it passes over a friction-driven spacing roller 60 which is positioned to control the area of contact of the surface 53 of the disc 52 with the cable 50. The cable 50 then passes through another roller arrangement 62 which comprises a driven roller 64 and a friction roller 66. These rollers in combination with a conventional motor driven coiler pull the cable through the system and perform the cable forming process. Any arrangement may be used for coiling the cable after it leaves the curing and molding disc 52.

The process of this invention was used for producing 10-strand high integrity cable from 29 gage conductor wire. The conductor wire was preinsulated with silicone rubber. The thermosetting resin used in the baths was RTV30 silicone rubber maintained at a viscosity of about 3500 centipoise. The baths 22, 25 and 28 were maintained at about 60° F. The diameter of the disc 52 used in this run was 10 inches. The conductor strands were threaded through the dies 16, 24, 26 and 30 and over the disc 30 and connected to a motor driven coiler. The conductors were drawn through the apparatus at a rate of 10 to 15 feet per minute with about 15 seconds residence time on the continuous molding and curing disc 52. The resultant insulation on the cable produced was homogeneously of high integrity and the individual insulated conductors were tightly bonded together in the flexible cured silicon rubber and yet could be easily separated without the use of special instruments.

Figure 6:
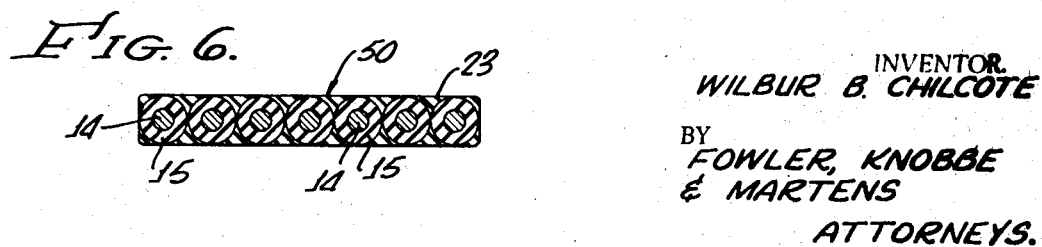
FIG. 6 is an enlarged transverse sectional view through a cable formed in accordance with this invention.

As shown in FIG. 6, the final cable construction is substantially rectangular in shape having flat upper and lower surfaces formed by the thermosetting resin 23 from the baths 22, 25 and 28. The disc 52 serves as a molding device since the resin is still a viscous fluid at the time it leaves the sizing die 30 and is shaped on the flat surface of the disc 52. In this manner the upper and lower surfaces of the cable conform very closely with the smooth surface 53 of the curing disc 52.

Each of the individual conductors 14 has a preapplied insulation 15 as shown in FIG. 6. The spacing between the conductors is controlled by the thickness of the insulation 15 and the resin 23 which penetrates therebetween. The spacing may be varied by movement of the transverse die blocks 36 to permit greater amounts of the thermosetting resin to penetrate between the individual conductors 14.

The use of three silicone rubber coating baths enhances the strength and durability of the cable since the first bath wets all surfaces of the individual conductor insulation before the conductors are squeezed together, the second bath coats the conductors while their insulation is transversely compressed together and the third bath adds a dimensioning layer of the silicone ruber or other thermosetting resin to the cable.

Since the individual conductors are insulated and the bonding strength between that insulation and the thermosetting resin is less than the strength of the individual insulation coatings, the conductors can be easily transversely separated for connection to various electrical terminals.

The invention may be embodied in other specific forms without departing from the spirit or essential characteristics thereof. The present embodiment is therefore to be considered in all respects as illustrative and not restrictive.

What is claimed and desired to be secured by Letters Patent is:

1. A process for forming insulated, flat cables from a plurality of electrical conductors comprising the steps of:

providing a plurality of insulated electrical conductors;

arranging said electrical conductors in a transversely-spaced substantially coplanar configuration;

coating each of said electrical conductors with a liquid thermosetting resin;

squeezing and pressing said electrical conductors transversely and vertically together to aid in removal of entrapped air from the liquid thermosetting resin and form a cable-like arrangement;

applying additional liquid thermosetting resin to said arrangement of conductors;

shaping said thermosetting resin on said conductor arrangement to control the dimensions of the coated cable being produced; and curing said thermosetting resin.

2. A process as defined in claim 1 wherein said resin is cured by heating said coated conductors to a temperature of from 250° to 600° F. to form a flexible, multistrand electrical cable.

3. A process as defined in claim 1 wherein said thermosetting resin is cured by contacting said coated arrangement of electrical conductors with a heated smooth surface which cures and molds the thermosetting resin into a flat-surfaced, cable configuration.

4. A process as defined in claim 3 wherein said thermosetting resin is cured by contacting said arrangement of conductors with the circumferential surface of a rotating disc which is maintained at a temperature of from about 250° to about 600° F., the circumferential surface of said disc being smooth for molding the surfaces of the cable being formed from the arrangement of conductors.

5. A process as defined in claim 1 further including coating said arrangement of conductors with a thermosetting resin after said cable-like arrangement has been formed and squeezing and pressing said arrangement of conductors a second time to aid in removal of entrapped air from the resin coating said arrangement and to compact said conductors into a cable.

6. A process as defined in claim 1 wherein said electrical conductors are preinsulated with silicone rubber and wherein said thermosetting resin is silicone rubber having a viscosity of from about 400 to about 7000 centipoise.

7. A process as defined in claim 1 wherein said thermosetting resin coating is applied to said coplanar spaced conductors and to said cable-like arrangement of conductors by passing said conductors through baths of silicone rubber having a curing accelerator therein and wherein the temperature of said silicone rubber baths is maintained at from about 50° to 75° to prevent cure thereof before said silicon rubber is applied to said conductors.

8. A process for forming flat insulated electrical cables as defined in claim 1 wherein: said plurality of conductors are each preinsulated with cured silicone rubber having the mechanical and electrical properties determined; said thermosetting resin is silicone rubber having a viscosity of from about 400 to about 7000 centipoise; said insulated conductors are each coated with said silicone rubber by passing said conductors through a bath of said silicone rubber so that said silicone rubber adheres to the insulation of each of said conductors; said conductors are squeezed and pressed together by means of a die so that the preinsulation of the conductors is compressed; said conductors while in said cable-like arrangement are passed through a second bath of silicone rubber and through a second squeezing and pressing die to deaerate the silicone rubber coating said arrangement; said arrangement is then passed through another bath of silicone rubber and through a sizing die having a die orifice larger than said squeezing and pressing dies; each of said baths of silicone rubber includes a metal salt curing accelerator therein and is maintained at from 50 to 75° F. and said silicone rubber on said arrangement is cured by passing said arrangement over a heated rotating cylindrical surface and maintaining said arrangement in contact with said surface for less than one complete rotation of said surface and then removing said arrangement from said surface as a cured multistrand electrical cable.

9. A process as defined in claim 8 wherein said silicone rubber in the baths has a viscosity of about 3500 centipoise, a sepecific gravity of about 1.45 and when cured on the cable has a Shore "A" hardness of about 60, a tensile strength of about 850 and an elongation of about 130%, said silicone rubber including a hydrocarbon selected from the group consisting of methyl, methyl phenyl, methyl vinyl and methyl phenyl vinyl.

10. Apparatus for forming flat cables from a plurality of strands of insulated electrical conductors comprising:
means defining a receptacle for receiving a viscous silicone rubber coating material;
a first squeezing and pressing die located at one end of said receptacle, said first die having a substantially rectangular orifice therethrough and including means on said first die for varying the orifice size;
a second receptacle in communication with the orifice in said first die, said second receptacle containing said viscous silicone rubber coating material therein;
a second squeezing and pressing die in communication with said second receptacle, said second die having a substantially rectangular orifice therein and including means on said second die for varying the size of said orifice;
a third receptacle in communication with the orifice in said second die, said third receptacle containing said viscous silicone rubber;
a silicone rubber sizing die in communication with said third receptacle, said sizing die having an orifice therein of substantially rectangular configuration and of slightly larger dimensions than the orifice in said first and second die;
an annular curing and molding disc adjacent said sizing die for receiving said cable thereon, said disc having a smooth circumferential surface wider than the orifice; and
heater means for heating said curing and molding disc to a sufficiently high temperature to cure said silicone rubber as the cable passes over said disc.

11. Apparatus for forming flat cables from a plurality of strands of insulated electrical conductors comprising:
a receptacle for receiving a viscous liquid thermosetting coating material;
a first squeezing and pressing die located at one end of said receptacle, said first die having a substantially rectangular orifice therethrough and including means on said first die for varying the orifice size;
a second receptacle in communication with the orifice in said first die, said second receptacle containing viscous liquid thermosetting coating material therein;
a second squeezing and pressing die in communication with said second receptacle, said second die having a substantially rectangular orifice therein and including means on said second die for varying the size of said orifice;
a third receptacle in communication with the orifice in said second die, said third receptacle containing viscous liquid thermosetting coating material;
a sizing die in communication with said third receptacle, said sizing die having an orifice therein of substantially rectangular configuration and of slightly larger dimensions than the orifice in said first and second die;
an annular curing and molding disc adjacent said sizing die for receiving said cable thereon, said disc having a smooth circumferential surface wider than the orifice; and
means for heating said curing and molding disc to a sufficiently high temperature to cure said thermosetting coating material as the cable passes over said disc.

References Cited
UNITED STATES PATENTS

| | | | |
|---|---|---|---|
| 2,864,728 | 12/1958 | Predota et al. | 117—232 |
| 3,042,569 | 7/1962 | Paul | 156—166 |
| 3,249,484 | 5/1966 | Courtney | 156—441 |

FOREIGN PATENTS

| | | |
|---|---|---|
| 709,373 | 5/1965 | Canada. |

VERLIN R. PENDEGRASS, Primary Examiner